United States Patent [19]

Smalley

[11] Patent Number: 5,556,517
[45] Date of Patent: Sep. 17, 1996

[54] SOLAR PROCESS FOR MAKING FULLERENES

[75] Inventor: Richard E. Smalley, Houston, Tex.

[73] Assignee: William Marsh Rice University, Houston, Tex.

[21] Appl. No.: 483,045

[22] Filed: Jun. 7, 1995

Related U.S. Application Data

[63] Continuation of Ser. No. 82,414, Jun. 28, 1993, abandoned.

[51] Int. Cl.$^6$ .................................................... C01B 31/02
[52] U.S. Cl. ................. 204/157.47; 423/445 B; 423/DIG. 19
[58] Field of Search ....................... 423/445 B, DIG. 19; 60/641.8, 641.15; 204/157.47

[56] References Cited

U.S. PATENT DOCUMENTS

| | | | |
|---|---|---|---|
| 4,000,733 | 1/1977 | Pauly | 423/248 |
| 5,227,038 | 7/1993 | Smalley et al. | 204/173 |
| 5,236,470 | 8/1993 | Levin | 423/579 |

FOREIGN PATENT DOCUMENTS 9204279  3/1992  WIPO.

OTHER PUBLICATIONS

Hammond et al., Ed., *Fullerenes: Synthesis, Properties and Chemistry*, Ch. 10–"Doping the Fullerenes," pp. 141–159 (1992).

Chai et al., *Journ. Phys. Chem.*, 95(20), "Fullerenes with Metals Inside", pp. 7564–7568, Oct. 3, 1991.

Haufler et al "Carbon Arc Generation of $C_{60}$", *Mat. Res. Soc. Symp. Proc.*, vol. 206 1991, pp. 627–637.

Smalley, "Self–Assembly of Fullerenes," *Acc. Chem. Res.*, 25(3), Mar. 1992, pp. 98–105.

Baum, "Flood of Fullerene Discoveries continues Unabated", *C & EN* Jun. 1, 1992 pp. 25–33.

IBM Technical Disclosure, vol. 34, No. 4B, Sep. 1991, p. 222.

*Primary Examiner*—Michael Lewis
*Assistant Examiner*—Peter T. DiMauro
*Attorney, Agent, or Firm*—Baker & Botts, L.L.P.

[57] ABSTRACT

This invention provides an improved process and apparatus for making fullerenes by vaporizing carbon and conducting the resulting carbon vapor to a dark zone for fullerene growth and annealing. In one embodiment concentrated solar energy is used to vaporize carbon. In a further embodiment, concentrated solar energy may be used to improve fullerene yields by vaporizing carbon and further to prevent carbon cluster formation until the carbon vapor passes into a dark zone for fullerene growth and annealing. The invention provides an improvement to increase the yield of any known process wherein carbon is vaporized under high light conditions, the improvement comprising providing a dark zone for fullerene growth and annealing.

8 Claims, 7 Drawing Sheets

SOLAR PROCESS FOR MAKING FULLERENES

This application is a continuation of application Ser. No. 08/082,414, filed Jun. 28, 1993, now abandoned

I. BACKGROUND OF THE INVENTION

1. Field of the Invention

This invention was made with Government support and the Government has certain rights in this invention. This invention relates to fullerenes and to a process for making macroscopic amounts of fullerenes.

2. Description of the Prior Art

A fullerene is a third form of pure carbon and is different from graphite and diamond, the only two forms known before 1985, see R. F. Curl and R. E. Smalley, "Fullerenes," Scientific American, October, 1991, pp. 54–63, incorporated herein by reference, and references cited therein. A fullerene structure is generally characterized as having each carbon atom bonded to three other carbon atoms. The carbon atoms curve around to form a molecule with cage-like structure and aromatic properties. One fullerene molecule referred to as "buckminsterfullerene" contains 60 carbon atoms bonded together in a spherical relationship, a structural diagram of which resembles the familiar shape of a soccer ball.

The molecular structure for buckminsterfullerene was first identified in 1985, see Kroto, et al., "$C_{60}$: Buckminsterfullerene", Nature, Vol. 318, No. 6042, pp. 162–163, Nov. 14, 1985. The process for making fullerenes described therein involves aiming a focused pulsed laser at a rotating solid disk of graphite to vaporize the carbon. The carbon vapor was then carried away by a high-density helium flow. That process did not utilize a temperature controlled zone for the growth and annealing of fullerene molecules from the carbon vapor formed by the laser blast, and only microscopic quantities of fullerenes were produced. Shortly thereafter, the laser technique was adapted to produce microscopic quantities of fullerenes containing a single atom of lanthanum inside the fullerene structure, see Heath, et al., "Lanthanum Complexes of Spheroidal Carbon Shells," J. Am. Chem. Soc., vol. 107, pp. 7779–7780, (1985).

The fullerene yields from laser vaporization were improved by providing a temperature controlled space for the carbon atoms in the carbon vapor to combine in a fullerene structure, see, Chai, et al., "Fullerenes with Metals Inside," J. Phys. Chem., Vol. 95, No. 20, pp. 7564–7568 (1991). This process was adapted to produce macroscopic amounts of fullerenes having one or more metal atoms inside, see Haufler, et al., "Carbon Arc Generation of $C_{60}$," Mat. Res. Soc. Symp. Proc., vol. 206, pp. 627–637, (1990), and Chai, et al., "Fullerenes With Metals Inside," supra.

Another method of making fullerenes was described by Ajie et al., "Characterization of the Soluble All-Carbon Molecules $C_{60}$ and $C_{70}$," J. Phys. Chem. Vol. 94, No. 24, 1990, pp. 8630–8633. The fullerenes are described as being formed when a carbon rod is evaporated by resistive heating under a partial helium atmosphere. The resistive heating of the carbon rod is said to cause the rod to emit a faint gray-white plume. Soot-like material comprising fullerenes is said to collect on glass shields that surround the carbon rod.

Another method of forming fullerenes in greater amounts is described by Haufler, et al., "Efficient Production of $C_{60}$ (Buckminsterfullerene), $C_{60}H_{36}$ And The Solvated Buckide Ion," J. Phys. Chem., Vol. 94, No. 24, pp. 8634–8636 (1990).

One disadvantage of the prior art is the low yield of fullerenes. Another disadvantage of the prior art is the relative difficulty with which large amounts of carbon are vaporized continuously and then condensed into soot comprising fullerenes. Although the prior art methods described above are suitable for production of fullerenes at relatively low rates, e.g. 10 grams per hour of (@$C_{60}$) and other fullerenes, they have not been efficiently scaled up to produce a soot comprising fullerenes at high rates, and having a high yield of fullerenes.

An intrinsic difficulty with vaporizing carbon to produce fullerenes is that the carbon source must be heated to over 2800° C. At these temperatures, black body emission is intense. The intense light produced by black body emission diminishes the yields of fullerenes in prior art processes, because large carbon clusters form in the carbon vapor while the carbon vapor has a relatively high carbon concentration and is relatively close to the intense light.

Although fullerenes such as (@$C_{60}$) absorb all wavelengths below about 7,000 angstroms, absorption of ultraviolet (UV) radiation (wavelengths below 3,500 angstroms) is 10–100 times stronger than light in the visible wavelengths. In prior methods of vaporizing carbon utilizing an electric arc, the plasma at the core of the arc can have a temperature in excess of 10,000° C. and will produce a large amount of UV radiation. The intense UV radiation from the plasma promotes photochemical destruction of fullerenes. This is because newly formed fullerenes moving away from the region very close to the arc are exposed to intense UV radiation and are excited to a triplet state for a few microseconds after absorption of the UV radiation, see Haufler, et al., Chem. Phys. Lett., 179, 448 (1991).

While a fullerene is in an excited triplet state, it is an open-shell species, that is more susceptible to reaction with other carbon species than in its normal closed-shell state. The result of the reactions of the carbon radicals in the excited triplet state is carbon clusters having very large numbers of carbon atoms. The reaction products are insoluble in the solvents normally used to dissolve smaller fullerenes.

The rate of the photochemical reaction of the carbon species in the excited triplet state increases linearly with photon flux and carbon radical concentration. In the prior art method of vaporizing carbon with an electric arc, the photon flux, especially UV radiation, and the carbon radical concentration are both relatively high within a few diameters of the carbon electrode tips. As the diameter of the carbon electrode is increased, the region where the photochemical reaction takes place and the high concentration of carbon radicals exists becomes larger in direct proportion to the electrode diameter. With carbon electrodes of relatively small diameters, the fullerenes are exposed to extremely intense UV radiation only briefly, and if carbon rods are heated resistively, only small amounts of UV radiation are produced. However, larger diameter electrodes, that would be used to make fullerenes at high rates, produce large amounts of UV radiation which causes a photochemical reaction of the newly formed fullerenes with the carbon vapors.

II SUMMARY OF THE INVENTION

The above-mentioned and other disadvantages of the prior art are overcome by the present invention which provides a method of producing fullerenes at a rate greater than rates achieved by prior art processes. The invention also provides a method for producing a carbon soot having a greater percentage of recoverable fullerenes than the soot produced by prior art process, and a method for increasing the percentage of fullerenes in carbon soot produced by prior art processes.

This invention provides a process and apparatus for making fullerene compounds by utilizing concentrated solar energy to produce a carbon vapor. The carbon vapor is then transferred to a fullerene growth and annealing zone where the carbon in the carbon vapor reacts to form fullerenes. Thereafter, the vapor is transferred to a condensing zone where the vapor condenses into soot comprising fullerenes. Optionally, the invention provides for generation of fullerenes by using concentrated solar energy to both vaporize carbon in a controlled environment and to prevent the formation of substantial amounts of large carbon clusters in the carbon vapor until the carbon vapor reaches conditions most favorable to formation of fullerenes. In this preferred embodiment concentrated solar energy contacts carbon vapor in a bright zone under conditions that substantially prevent formation of carbon clusters having more than 30 carbon atoms in the bright zone. In this preferred embodiment, the formation of substantial amounts of carbon clusters having more than 30 carbon atoms does not occur until the carbon vapor enters the fullerene growth and annealing zone. One aspect of the invention is its ability to provide a carbon vapor having a relatively low carbon concentration. The growth and annealing of fullerenes proceeds more efficiently in a carbon vapor that has a relatively low concentration of carbon and produces soot with a higher yield of fullerenes. In prior art methods of producing fullerenes, the carbon vapor cools and condenses into clusters before the appropriately low carbon concentration is achieved.

The invention also provides a process and apparatus for passing carbon vapor from a vaporization zone and optionally through a bright zone under conditions that substantially prevent formation of carbon clusters having more than 30 carbon atoms in the carbon vapor, and then passing the carbon vapor into the fullerene growth and annealing zone. This optional embodiment of the invention substantially reduces the amount of carbon in the carbon vapor that forms into large clusters before the carbon vapor enters the fullerene growth and annealing zone where conditions enhance the amount of carbon vapor that forms into fullerenes as opposed to graphitic carbon. In an additional optional embodiment, the fullerene growth and annealing zone is maintained in relative darkness (as further explained herein).

Another aspect of the invention provides a process and apparatus for improving the yield of fullerenes condensed from carbon vapors produced by methods already known in the prior art. For example, prior art methods of producing a carbon vapor that can be condensed into soot comprising fullerenes include vaporization of carbon accomplished by contacting a pulsed laser beam with a graphite target, see Chai, et al., "Fullerenes With Metals Inside," electrical resistive heating of graphite, see Ajie, et al., and electric arc/plasma heating of graphite, see Haufler, et al., "Efficient Production of $C_{60}$." The yield of fullerenes produced by any of these techniques can be increased by introducing the carbon vapor into a bright zone and/or a fullerene growth and annealing zone that is maintained in relative darkness (as further explained herein).

Optionally one or more metals may be contacted with the carbon vapor. Atoms of the metal will react with carbon in the carbon vapor to form fullerenes wherein the carbon-bonded network encloses one or more atoms of the metal (to make a "metallofullerene"). The fullerene molecules, along with graphite carbon molecules, are then condensed and collected as solid soot. The fullerenes may be purified by subliming the fullerenes from the soot and then condensing them, or by extracting the soot with an appropriate solvent such as benzene, toluene or xylene followed by evaporation of the solvent to yield fullerene molecules in solid form. Although the present invention is primarily described herein by reference to an all carbon fullerene cage, atoms of elements other than carbon may also be incorporated in the fullerene cage network as described in Chai, et al., J. Phys, Chem., Vol. 95, No. 20, pp. 7564–7568 (1991).

Doped fullerenes are useful as p-type or n-type dopants in fullerene semiconductor devices. Metallofullerenes are used for making stable metal/carbon composites, and are also useful for catalysis and preparation of metal containing polymers and glasses. Many other uses for fullerenes exist, including use in ink compositions as described in U.S. Pat. No. 5,114,477.

IV. DETAILED DESCRIPTION OF THE INVENTION

Nomenclature

In this application, accepted symbols for elements and subscripts to denote numbers of elements will be utilized to describe molecules. In addition, a set of parentheses around the symbol "@", will be used to indicate that the atoms listed within the parentheses are grouped to form a fullerene. Within the parenthetical group, all atoms listed to the right of the @ symbol are part of the fullerene cage network, and all atoms to the left of the @ symbol are situated inside the cage. Under this notation, buckminsterfullerene is ($@C_{60}$), and a $C_{60}$-caged metal species is written ($M@C_{60}$) where M represents the caged metal. A more complex example is $K_2(K@C_{59}B)$, which denotes a 60-atom fullerene cage with one boron atom substituted for a carbon in the fullerene cage network, a single potassium atom trapped inside the fullerene cage, and two potassium atoms adhering to the outside.

The invention, in one aspect, provides a method for making fullerene or metallofullerene molecules by a process wherein a carbon source material and optionally a metal are vaporized in an atmosphere selected to form fullerenes utilizing concentrated solar energy, moving the vapor produced to a fullerene growth and annealing zone, and thereafter, condensing the vapor into a soot comprising fullerenes.

The Carbon Source Material

A carbon vapor may be provided by vaporizing any source of carbon. Diamond, graphite, fullerene or combinations thereof may serve as the carbon source. Graphite is cheaper and is therefore preferred. Graphite, as used herein, also includes so called amorphous carbon, carbon black and the like, all of which have a microcrystalline graphitic structure.

The carbon source may be pure carbon to result in unsubstituted fullerenes formed after vaporization. Alternatively, the carbon source may contain other elements or compounds selected to form a desired type of substituted or "doped" fullerene after vaporization. Elements including boron (B) and nitrogen (N) can be substituted for one or more carbon atoms in the fullerene network.

The element, one or more atoms of which are to be substituted for carbon in the fullerene network, may be combined with the carbon to be vaporized either in a pure elemental state, or combined with other elements in a molecular compound. Presently, it is believed that any compound containing the desired element could be used, with the exception of hydrogen containing compounds, since hydrogen hinders the formation of fullerenes. For instance, the carbon source may contain elemental boron or boron nitride (BN) in addition to carbon. Upon vaporization, some of the boron atoms will be incorporated into the fullerene cage network to form, for example $(@C_{59}B)$, $(@C_{58}B_2)$, $(@C_{68}B_2)$ and $(@C_{64}B_6)$.

Atoms of nitrogen may be incorporated into the fullerene cage by combining potassium cyanide (KCN) with carbon in the carbon source material and vaporizing the KCN concurrently with the carbon. Other sources of nitrogen may be used, for example iron (III) ferricyanide, $(Fe_2(CN)_6)$. Any element which is capable of forming bonds with three carbon atoms in a fullerene network may be included with the carbon source to result in fullerenes having elements other than carbon as part of the fullerene cage network. Therefore, a fullerene network may be formed entirely of carbon or it may have one or more atoms other than carbon substituted therein.

The product of any fullerene generation process may be used as the carbon source for a subsequent fullerene generation. The product used in the subsequent fullerene generation may be the raw soot produced in a fullerene generation process, the refined soot enriched in fullerenes or the insoluble extracted material depleted in fullerenes. For instance, the carbon source may comprise carbon in forms including graphite and fullerenes generated in electrical arc processes, by laser vaporization, resistive heating or by the solar powered furnace described herein. The raw soot produced by any of those processes may then become the carbon source for the present process. Alternatively, fullerenes may be separated from the soot by extractive separation, and either the enriched portion or the depleted portion vaporized by concentrated solar energy.

Form of Carbon Source

The carbon source may be in the form of a solid shape, for example a rod, a sphere, a disk, a hollow tube or any other shape. The carbon source may also be in the form of a powder, for example, graphite dust. The particle size range for any such powdered carbon source is preferably in the range of 0.1 to 100 microns, more preferably in the range of 1 to 10 microns. The solid shapes and powders may comprise any one or more of the different types of carbon, in addition to any one or more metal compound or other doping element optionally utilized. For example, powder mixtures of graphite and fullerenes, graphite and diamond, and graphite, boron nitride and $La_2O_3$ can be used to make fullerenes including metallofullerenes in accordance with this invention.

The Metal

The metal useful in this invention is any metal that, when contacted with a carbon vapor, is capable of interacting with the carbon vapor to form fullerenes having one or more atoms of the metal inside the fullerene network.

Any metal atom may be enclosed by a fullerene structure, if the fullerene structure is large enough to accommodate the metal atom inside, and therefore all metals may be utilized in this invention. Metals particularly useful in the invention include all metals in Group IA, IIA, IIIA, IIIB, IVA, VA, the lanthanide series and the actinide series of the Periodic Table of the Elements, found in CRC, Handbook of Chemistry and Physics, 67th Edition, 1986–1987, CRC Press, Inc., Cleveland, Ohio. Metals in Group IA are sodium, potassium, rubidium, cesium and francium. Metals in Group IIA are beryllium, magnesium, calcium, strontium, barium and radium. Metals in Group IIIA are aluminum, gallium, indium and thallium. Metals in Group IIIB are scandium, yttrium, lanthanum and actinium. Metals in Group IVA are germanium, tin and lead. Metals in Group VA are antimony and bismuth. The Lanthanide series includes cerium, praseodymium, neodymium, promethium, samarium, europium, gadolinium, terbium, dysprosium, holmium, erbium, thulium, ytterbium, and lutetium. The actinide series includes thorium, protactinium, uranium, neptunium and plutonium. Particularly preferred metals that have been enclosed inside a fullerene network include lanthanum, scandium, yttrium, terbium, calcium and uranium.

Prior to contact with the carbon vapor, the metal may be utilized in the pure metallic state or it may be chemically combined with other elements in metallic compounds. The term "metal compound" used herein is intended to encompass both the pure metal, e.g. La, or a metal combined with another element, e.g., $La_2O_3$. In particular, oxides, carbides and halides of metals, as well as other metal compounds can be utilized in this invention. Particularly preferred metal compounds are the pure metals, the oxides including $La_2O_3$, CaO, $Y_2O_3$, $Sc_2O_3$, $UO_2$, and $Tb_4O_7$, carbides including $CaC_2$, and halides including $UCl_4$ and $LaCl_3$.

The Carbon Source/Metal Combination

The carbon source material and the metal compound, if used, may be combined prior to carbon vaporization. The combination may be made, for example, by mixing graphite with the metal compound and then processing the relatively homogeneous mixture into a rod in accordance with methods known in the art for producing graphite electrodes. The rod containing the metal compound is then utilized in the vaporization described herein. The metal compound may also be utilized in the form of a powder combined with a powdered form of carbon. Optionally, the carbon rod may be constructed of graphitic carbon and the metal compound can be dispersed as an aerosol in the atmosphere selected to form fullerenes that is introduced to the vaporization zone. Such a metal compound aerosol in an atmosphere selected to form fullerenes may be contacted with carbon in the vaporization zone, the bright zone, the fullerene growth and annealing zone, or combinations thereof. The amount of metal utilized in the combination is not critical but generally ranges from 0.01 to 50 atom %, preferably 1 to 20 atom % based on the number of atoms of metal compared to the total number of atoms of metal and carbon.

The Atmosphere Selected to Form Fullerenes

Vaporization of carbon should occur in an atmosphere selected to form fullerenes. Such an atmosphere will promote, or at least not hinder, the formation of fullerenes. The atmosphere selected to form fullerenes includes inert gases such as helium, neon, argon, krypton, xenon and mixtures thereof. Other gases may be useful in providing an atmosphere selected to form fullerenes as long as the molecules of the atmosphere are not reactive with the carbon vapor. Other possibilities for the atmosphere include carbon monoxide, carbon dioxide and nitrogen. The atmosphere selected to form fullerenes should not contain hydrogen since even small quantities, e.g., 5, 2, or 0.5 mole %, of hydrogen containing gasses such as hydrogen, water vapor, ammonia, and methane drastically reduce the amount of fullerenes in the soot or prevent the formation of fullerenes altogether. Currently, an argon or helium atmosphere is preferred.

The carbon vapor is preferably formed in an inert gas at a relatively low pressure. The absolute pressure of the atmosphere selected to form fullerenes can be a minimum of 1, 5, 10, 50 or 100 Torr and can range up to a maximum of 20,000, 2,000, 700, 200, 100, 50, 10 or 5 Torr. Absolute pressures of argon or helium ranging from 1 to 100, preferably 5 to 50 Torr have been found to be particularly useful for generating a carbon vapor from which fullerenes may be condensed. The pressure of the atmosphere selected to form fullerenes is preferably kept as low as possible consistent with efficient formation of fullerenes from the carbon vapor. Lower pressures produce carbon vapors having lower carbon concentrations, which helps produce greater yields of fullerenes. However, the absolute pressure should not be so low that it becomes difficult to prevent soot deposits on the window through which concentrated solar energy passes. Preferably, in the solar powered furnace, the atmosphere selected to form fullerenes will be comprised of a gas having relatively low thermal conductivity, therefore, argon, having a lower thermal conductivity than helium, is preferred.

The Solar Process

The present invention uses concentrated solar energy to vaporize carbon from a carbon source. The concentrated solar energy is introduced to a vaporization zone comprising a carbon source in an atmosphere selected to form fullerenes. The concentrated solar energy heats and vaporizes carbon from the carbon source to produce a carbon vapor which condenses into a soot comprising fullerenes. The use of concentrated solar energy to vaporize carbon in accordance with this invention permits the vaporization to occur at temperatures that are significantly lower than carbon vaporization temperatures in the electrical arc method of generating fullerenes.

Solar energy (rays of sunlight) may be concentrated by one or more sets of mirrors arranged to reflect solar energy incident on the relatively large surface area of those mirrors into a relatively smaller area. Solar energy may also be concentrated by arranging lenses in an array to collect solar energy from a wide area and focus it into a smaller area. In one common method of concentrating solar energy, flat mirrors are arranged in an array so that each flat mirror will track the change in position of the sun relative to earth and direct the solar energy into the concave area of a fixed parabolic mirror. Increasing the total surface area of such mirrors (by using bigger mirrors, more mirrors, or both) will increase the amount of solar energy that can be directed into the parabolic mirror. Therefore, if more solar energy is needed to vaporize carbon, more and/or bigger mirrors may be used. Methods of concentrating solar energy in this manner are known, for instance see J. F. Kreider, "Medium and High Temperature Solar Processes," Academic Press, New York, 1979. A relatively large solar furnace is in operation at Odeillo, France and that furnace, or one similar thereto, would be appropriate for commercial scale production of fullerenes. Concentrated solar energy may also be produced in a Winston Concentrator, for example, see, R. Winston, W. T. Welford, "Applied Optics," Vol. 19, p. 347 et. seq., 1980, and W. T. Welford, R. Winston, "The Optics of Non-Imaging Concentrators," Academic Press, New York, 1978.

The flat mirrors, concentrating lenses or other sunlight collecting means should direct enough solar energy to the parabolic mirror to generate a beam of concentrated solar energy strong enough at the focal point to heat and vaporize carbon from the carbon source. The relative size of the vaporization zone, and optionally, the bright zone, determine the size of parabolic mirror that should be utilized to produce concentrated solar energy. A parabolic mirror capable of producing the required vaporization zone and the optional bright zone is described in Example 1. Bigger parabolic mirrors can be used to produce bigger vaporization zones and bright zones. If the concentrated solar energy produced by a parabolic mirror needs to be increased in order to reach the temperatures necessary to vaporize carbon and optionally to produce the bright zone, flat mirrors can be used to reflect more sunlight into the parabolic mirror. Preferably, the intensity of the beam of concentrated solar energy at the focal point of the parabolic mirror is at least 1000 watts/cm$^2$, more preferably within the range of 1500 to 2000 watts/cm$^2$.

Although term concentrated solar energy is used primarily in reference to light energy directly collected from the sun, it also includes artificially produced light energy having a broad band of wavelengths. For instance, parabolic mirrors are commonly used in arc lighting systems, for example search lights. In such lighting, an arc is established near the focal point of the parabolic mirror and light traveling out from that point reflects from the parabolic mirror out in a wider beam of light. That wider beam of light can be captured by a second parabolic mirror and focused again back down to the focal point of the second parabolic mirror. Alternatively, an arc light may be placed at one focal point of an ellipsoid mirror (having two focal points) to produce concentrated odor energy at the second focal point of the ellipsoid mirror. The arc element in an arc light may be doped with rare earth elements such as lanthanum and/or cerium to produce a brighter light as is known in the art. Such concentrated light energy is encompassed by the term concentrated solar energy as used in this specification.

The carbon source heated by concentrated solar energy should be maintained in an atmosphere selected to form fullerenes. As the concentrated solar energy is focused on the carbon source, the carbon will be heated to form a carbon vapor. The term "vaporization zone" when used in connection with the solar furnace describes the area around the carbon source where the beam of concentrated solar energy contacts the carbon source and heats it to form a carbon vapor. For the solar furnace the vaporization zone will comprise the carbon source, an atmosphere selected to form fullerenes, concentrated solar energy and, after vaporization begins, carbon vapor. The term "vaporization zone" when used in connection with other methods of vaporizing carbon describes the area around the carbon source utilized in such method where carbon vaporization occurs.

In a preferred embodiment, the vaporization zone is maintained in a chamber that is sealed off from contact with whatever atmosphere exists around the parabolic mirror. Using such a separate vaporization chamber provides the ability to manipulate conditions inside the vaporization chamber more easily and to more easily maintain the carbon source in an atmosphere selected to form fullerenes. To permit the beam of concentrated solar energy to make contact with carbon contained in such a vaporization chamber, it is necessary to provide a window in the vaporization chamber through which the beam of concentrated solar energy can be transmitted. The window may be constructed of any material through which concentrated solar energy can be transmitted. Fused silica, often referred to as quartz, pyrex, or any other optical quality glass, will be suitable if adequate cooling is provided to keep the material in the window from cracking or softening. Preferably, the window is coated on both surfaces (inside and outside) with a broad band dielectric anti-reflective coating that will minimize reflective losses from the surfaces of the window. Such a window permits the concentrated solar energy to pass from the parabolic mirror, through the window and into the vaporization chamber where the concentrated solar energy will contact, heat and vaporize carbon. Portions of the vaporization chamber other than the window may be constructed of any material that is appropriate given the temperatures and relatively low internal pressures utilized to vaporize carbon. Stainless steel, 316, 304, etc., quartz, water-cooled aluminum, copper, brass, and pyrex are suitable materials for constructing the vaporization chamber. It should be obvious that materials of construction need not be able to function at the relatively high carbon vaporization temperature (3000° C. or more) because the vaporization chamber walls will be spaced away from the vaporizing carbon, and optionally, will be cooled by flow of an atmosphere selected to form fullerenes. Obviously, if the vaporization chamber is quartz or another transmissive material, there will be no need for a separate window structure in the vaporization chamber, since the vaporization chamber itself would permit transmission of concentrated solar energy through the walls of the vaporization chamber.

For continuously producing fullerenes, the vaporization chamber preferably comprises entrance passageways through which a carbon source and an atmosphere selected to form fullerenes may be introduced to the vaporization zone, and an exit passageway through which carbon vapor can be withdrawn from the vaporization chamber along with the atmosphere selected to form fullerenes. The exit passageway need not be clearly defined by the structure of the vaporization chamber, if for example, the fullerene growth and annealing zone and optionally the bright zone are all physically located in the same structure that defines the vaporization chamber.

Optionally, the vaporization zone may utilize a supplemental heating means for heating the carbon source. The supplemental heating means can be used to offset losses of heat from the vaporization zone that normally occur during operation of the process due to conduction, convection and radiation of heat away from the carbon source. The intensity of heat supplied by the supplemental heating means (the supplemental heat) should be controlled so that the supplemental heat does not vaporize carbon. For example, if the carbon source is a carbon rod, a tungsten heating element may be wrapped around the carbon rod spaced a short distance from the carbon rod. When electricity is passed through the tungsten heating element, the tungsten heating element becomes hot and heat is radiatively transferred to the carbon rod. Other supplemental heating means useful in this invention include: (1) heat exchangers, that will heat at least a portion of a flow of an atmosphere selected to form fullerenes, connected to conduits and pumps or fans to direct the heated flow into contact with the carbon source, (2) infrared and/or microwave beams of energy directed to contact the carbon source and controlled in intensity so that carbon is heated but not vaporized by such beams, and (3) concentrated solar energy directed to heat the flow of an atmosphere selected to form fullerenes. The supplemental heating means may be used to heat whatever form of carbon source is utilized, e.g. solid shapes, powders, mixtures of one or more metal compounds and carbon in solid shapes and powders, and combinations thereof.

The temperatures within the vaporization zone will vary depending on the particular location within the vaporization zone. Generally, locations more distant from the carbon being vaporized will be cooler than closer ones. Temperatures within the vaporization zone of a solar powered furnace can range from room temperature at the inside wall of a vaporization chamber to 4000° C. at the hottest point where carbon is being vaporized. Temperatures immediately surrounding the location where carbon is being vaporized in a solar powered furnace range from 1200° to 3000° C. Since the vaporization zone is maintained within an atmosphere selected to form fullerenes, the pressure in the vaporization zone is the same as described above in connection with the description of the atmosphere selected to form fullerenes.

During operation of the solar powered furnace, the concentrated solar energy heats and vaporizes carbon from the carbon source to form a carbon vapor. The term carbon vapor, as used in this particular specification, means not only a vapor fully consisting of carbon atoms, but also includes mixtures of carbon atoms and carbon clusters of various sizes. In a preferred embodiment, the vaporization of carbon from the carbon source should be complete enough to produce a carbon vapor comprising substantial amounts of carbon in the form of individual carbon atoms (or ions) or in the form of carbon clusters having fewer than 30 carbon atoms and more preferably, clusters of carbon having fewer than 10 carbon atoms (in this specification, the term "preferred carbon vapor" will be used to refer to a carbon vapor having substantial amounts of carbon in the form of individual carbon atoms or ions or clusters having fewer than 10 carbon atoms). The term "substantial amounts" as used in connection with specifying the amount of carbon in the desired state means that more than 70% of the carbon in the vapor state is in the desired state ((mass of carbon vapor in the desired state÷mass of carbon vapor)×100). After a preferred carbon vapor is produced, it should be removed from the vaporization zone as quickly as is practicable (because further heating will not improve the qualities of the carbon vapor).

After the carbon vapor is removed from the vaporization zone, it should be introduced into a fullerene growth and annealing zone. In the fullerene growth and annealing zone, the conditions of temperature, pressure, atmosphere, residence time, and optionally light energy are controlled to promote growth and annealing of fullerenes from the carbon vapor.

Movement of carbon vapor away from the carbon source and into a fullerene growth and annealing zone is preferably aided by a transporting flow of the atmosphere selected to form fullerenes. The transporting flow of an atmosphere selected to form fullerenes is preferably a heated laminar flow. Optionally, the transporting flow directs the carbon vapor through a bright zone and then into a fullerene growth and annealing zone, preferably a dark zone. Such a transporting flow helps provide for expansion of the carbon vapor to a relatively low concentration of carbon and helps maintain the carbon vapor at a temperature to prevent formation of large amounts of carbon clusters having more than 30 carbon atoms. Optimally, the transporting flow and the bright zone maintain the carbon vapor as a preferred carbon vapor until the carbon vapor reaches a fullerene growth and annealing zone. The temperature and flow rate of the transporting flow can be tailored to produce optimum conditions in the bright zone, and such tailoring provides much of the important control over the vaporization and growth and annealing process. The temperature of the transporting flow may range from 1000° to 2000° C., preferably 1200° to 1500° C. The flow rate may be adjusted to keep the carbon vapor in the bright zone for the length of time desired.

Buffer flows of an atmosphere selected to form fullerenes may be arranged concentrically around the transporting flow, and adjusted so that the innermost flow directly adjacent to the transporting flow is at the highest temperature and the outermost flow, which may pass up along the inside walls of a vaporization chamber, is the coolest. This arrangement provides for cooling of the walls of the vaporization chamber and keeps the inside wall of the window into the vaporization chamber free from soot.

In the fullerene growth and annealing zone, carbon from the carbon vapor forms into fullerenes. In the fullerene growth and annealing zone, the conditions are controlled to increase the yield of recoverable fullerenes that can be obtained from the soot. The term "yield" as used in this specification means the weight of fullerenes recovered from the soot in relation to the weight of the entire amount of soot.

The optimum range for conditions in the fullerene growth and annealing zone will vary depending on the circumstances of each particular process of vaporizing carbon, e.g. the rate of carbon vaporization, the rate of flow, if any, of the atmosphere selected to form fullerenes, and the relative concentration of carbon in the carbon vapor. Normally, the optimum range for the temperature in the fullerene growth and annealing zone should be from 1200° to 4000° C., preferably 1200° to 2000° C., more preferably 1200° to 1500° C. The optimum range for the pressure in the fullerene growth and annealing zone is the same as discussed above in connection with the atmosphere selected to form fullerenes, and the optimum atmosphere is an atmosphere selected to form fullerenes, preferably argon or helium or mixtures thereof. The residence time in the fullerene growth and annealing zone is not critical but should be sufficiently long that fullerenes are formed in the carbon vapor. Optionally, light is excluded from the fullerene growth and annealing zone in as great an extent as is possible.

A carbon vapor comprising fullerenes passes out of the fullerene growth and annealing zone into a condensation zone. Conditions in the condensation zone are maintained to cool the carbon vapor to condense soot from the vapor. Temperatures in the condensation zone may range from room temperature up to 800° C. or more. A condensation zone may be established automatically in the solar powered furnace by natural cooling that occurs as the carbon vapor leaves the fullerene growth and annealing zone. Alternatively a condensation zone may be established by passing the carbon vapor through a region where heat is removed from the carbon vapor by a cooling medium, for example, a heat exchanger.

An advantage of utilizing concentrated solar energy to vaporize carbon is that a beam of concentrated solar energy is directional light. Light produced in prior art vaporization of carbon coming from the carbon source itself travels out from the carbon source in all directions and therefore is not amenable to provision of a dark zone. Since the beam of concentrated solar energy is directional, a shadow-producing device can be inserted into the beam to provide the desirable dark zone. In this specification, the term "dark zone" will be used to refer to a species of fullerene growth and annealing zones wherein light is excluded. Practically, it is not possible to exclude all light from entering the dark zone and this specification should not be read to teach that all light must be excluded from a fullerene growth and annealing zone before it may appropriately be classified as a dark zone. Accordingly, a significant amount of the light which is usually present during vaporization of carbon should be excluded from the dark zone, but the amount of light that enters a dark zone need not be so small that the dark zone is maintained in total darkness.

Light intensity in the dark zone may be expressed in terms of the light intensity in the dark zone compared to the light intensity at the surface of the carbon source being vaporized. The light intensity in the dark zone should be reduced by a factor of five or more from what such intensity is at the surface of carbon being vaporized, preferably 10 or 20 times reduced and most preferably 100 times reduced. The term "light" as used in this specification means electromagnetic radiation of wavelengths shorter than 700 nm.

The solar powered furnace method of vaporizing carbon described herein is especially adaptable to the establishment of a dark zone. In the solar furnace, a beam of concentrated solar energy is directed across a carbon source to vaporize carbon. Near the focal point of the parabolic mirror used in one embodiment of a solar furnace, the beam of concentrated solar energy is substantially directional, meaning that most of the energy of the beam is travelling in more or less the same direction. Accordingly, a dark zone can be established in a solar furnace by providing a substantially opaque structure to block most of the energy of the beam from travelling past the opaque structure. The side of the opaque structure facing toward the oncoming beam of concentrated solar energy will be illuminated during operation of the solar furnace, but the side of the opaque structure facing away from the oncoming beam of concentrated solar energy will be relatively dark and establish the darkness required for a dark zone.

Any material that is opaque to light and that can withstand the high temperatures generated in the dark zone portion of the solar furnace can be used to construct an opaque structure. Preferable materials include graphite and stainless steel. The shape and arrangement of the opaque structure are not critical as long as the opaque structure functions to exclude a substantial amount of the light present during vaporization of carbon. For example, an opaque wall may be positioned in the solar furnace to block most of the light so that areas behind the wall (in relation to the direction from which the concentrated solar energy beam travels) so that the area behind the wall is substantially dark. Another example for the opaque structure is a cylindrical tube, having tube walls that are opaque. The tube should be placed relatively perpendicular to the direction of the beam of concentrated solar energy so that the space inside the tube is relatively dark and establishes a dark zone.

It has been determined that maintaining the fullerene growth and annealing zone in relative darkness substantially increases the yield of fullerenes in the soot. Accordingly, this aspect of the invention applies to all known methods of vaporizing carbon and can be utilized to improve the yields of fullerenes in all prior art methods of making fullerenes.

A further feature of this invention is the establishment and maintenance of yet another zone, referred to in this specification as a "bright zone". The term "bright zone" as used herein means a zone between the vaporization zone and the fullerene growth and annealing zone having an energy flux sufficient to maintain the carbon vapor as a preferred carbon vapor. The bright zone thus postpones formation of large (greater than 30 carbon atoms) carbon clusters until the carbon vapor has moved far enough away from the area where carbon is being vaporized in the vaporization zone so that the energy flux of the vaporization zone does not interfere with fullerene growth and annealing to significant extent. The energy to be introduced to the bright zone may be provided by concentrated solar energy, laser, or thermal sources. In a preferred embodiment solar energy is concentrated to a flux of greater than 500 watts/cm$^2$, preferably greater than 1000 watts/cm$^2$, more preferably greater than 1500 watts/cm$^2$, and most preferably greater than 2000 watts/cm$^2$. The bright zone may be established by varying the profile of the concentrated solar energy to produce a sufficiently large flux such that any large clusters of carbon in the bright zone are reduced in size by photolysis or thermal decomposition. One function of the bright zone is to provide an environment of sufficient energy flux or temperature so that the carbon vapor in this bright zone is maintained as a preferred carbon vapor. The concentrated solar energy introduced to the bright zone should be sufficient to maintain the preferred carbon vapor until such time as the preferred carbon vapor is transferred into the fullerene growth and annealing zone which is preferably a dark zone.

The atmosphere in the bright zone should be an atmosphere selected to form fullerenes, and therefore the absolute pressure in the bright zone should be as described herein in connection with the atmosphere selected to form fullerenes. The temperature in the bright zone is not the only critical feature of the bright zone and therefore quantifying only a temperature for the bright zone may not be the best criteria for its description. Preferably, the temperatures in the bright zone will be at least 1200° C., and preferably in the range of 1500° to 4000° C. The bright zone keeps the size of carbon clusters low due not only to thermolysis (bond disruption due to temperature) but also due to photolysis (bond disruption caused by the light itself). Therefore, the light intensity in the bright zone is important in addition to the temperature. The bright zone will be sufficiently "bright" if the concentrated solar energy flux is greater than 500 watts/cm$^2$.

Although the main criteria for a bright zone is a minimum level of light flux, and a main result of establishing the bright zone is production of a carbon vapor having a relatively low concentration of carbon and preferably producing a preferred carbon vapor, the residence time of the carbon vapor in the bright zone should be at least one microsecond and preferably in the range between one microsecond and one-tenth second. Preferably, the carbon vapor residence time in the bright zone will range between 0.1 to 10 milliseconds, more preferably 0.5 to 5 milliseconds. Another way of expressing residence time is appropriate when considering vaporization of carbon rods, since UV radiation produced from the rod will drop off in intensity depending upon the square of the distance away from the rod. Preferably, the bright zone will extend for at least one-half the distance of the diameter of the rod, preferably greater than 1 rod diameter, more preferably greater than 2 rod diameters and most preferably 2 to 10 rod diameters.

The dimensions of the bright zone of this invention will be determined by the size of the beam of concentrated solar energy, the placement of an opaque structure, and the placement of the carbon source in relation to the concentrated solar energy. Bright zones can be produced in accordance with this invention having a diameter (through which the carbon vapor will pass) of 0.1 to 10 cm. Preferably, the bright zone will have a diameter of 0.5 to 5 cm, more preferably 1 to 5 cm.

This invention, and more specifically, the bright zone of this invention, overcomes two problems that have limited the yield in prior methods of producing fullerenes. The concentration of carbon in the carbon vapor (weight/volume) from which fullerenes are condensed in prior art processes is relatively high. Upon moving away from the source of vaporizing energy, the carbon vapor expands and cools rapidly, resulting in the formation of large carbon clusters due in part to rapid cooling, but also due to the relatively high concentration of carbon in the carbon vapor. The bright zone, which is one aspect of this invention, keeps the carbon from forming into large clusters (greater than 30 carbon atoms) longer than prior art processes, giving the carbon vapor a greater chance to expand than in prior art processes. The bright zone therefore provides for the production of a carbon vapor in a relatively low carbon concentration and the transportation of that vapor, in relatively low carbon concentration, to a fullerene growth and annealing zone where conditions favor formation of fullerenes in the carbon vapor.

Another advantage of the bright zone is the opportunity it provides for contacting and mixing carbon vapor with dopants or metal compounds. For example, a metal compound may be introduced to the bright zone in the form of an aerosol dispersed in an atmosphere selected to form fullerenes. Such an introduction may be accomplished by injecting the metal compound aerosol in the transporting flow of an atmosphere selected to form fullerenes that is directly adjacent to the carbon source material and that surrounds the carbon vapor once produced. Even if the transporting flow is nearly laminer, as is preferred, or only mildly turbulent, enough mixing will occur to disperse the metal compound aerosol in the carbon vapor prior to introduction of the carbon vapor and the transporting flow into the fullerene growth and annealing zone. Mixing may be accomplished in turbulent flow if the window through which concentrated solar energy passes is far enough from the carbon vapor or otherwise protected so that soot does not collect on the window. The improved capability of mixing a metal compound with a carbon vapor and the capability of maintaining the carbon vapor as a preferred carbon vapor until introduction to the fullerene growth and annealing zone, provides for higher yields of metallofullerenes. The lower concentration of carbon in the carbon vapor of this invention slows down the carbon cluster growth rate to provide more time for efficient annealing.

The bright zone of this invention may also be utilized with methods of vaporizing carbon in addition to the solar powered furnace described herein. The establishment of a bright zone in such methods will provide for increased yields of fullerenes.

Apparatus

Figure 1:
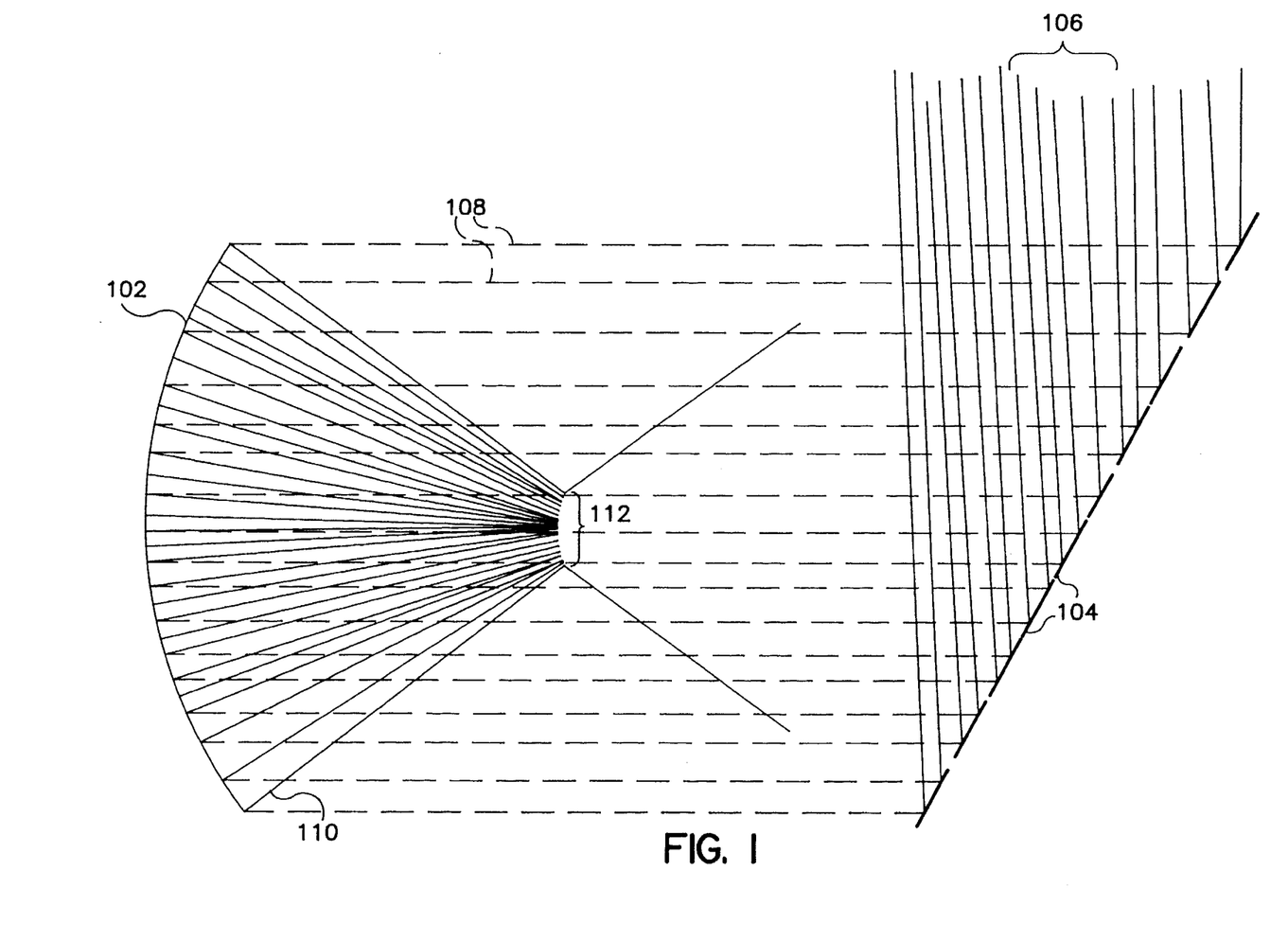
FIG. 1 is a diagram of an apparatus for concentrating solar energy.

The invention may be further understood by reference to the figures. FIG. 1 shows a method of concentrating solar energy using reflecting flat mirrors to direct sunlight into a parabolic mirror. A converging parabolic mirror 102 is mounted to receive solar energy reflected from flat mirrors 104. The flat mirrors 104 redirect incident solar energy, represented by lines 106, toward parabolic mirror 102. Solar energy reflected from flat mirrors 104, represented by lines 108 are directed into parabolic mirror 102 by maintaining the plane of flat mirrors 104 angled appropriately with respect to the sun and parabolic mirror 102. As the position of the sun relative to earth changes, the angle of flat mirrors 104 should be adjusted so that solar energy continues to be directed into parabolic mirror 102. Methods for adjusting the angle of flat mirrors 104 to track the sun are known in the art.

The reflected solar energy represented by lines 108 strikes the reflective surface of parabolic mirror 102 and is reflected toward the focal point 112 of parabolic mirror 102. The solar energy reflected from parabolic mirror 102 is represented by lines 110.

Figure 2:
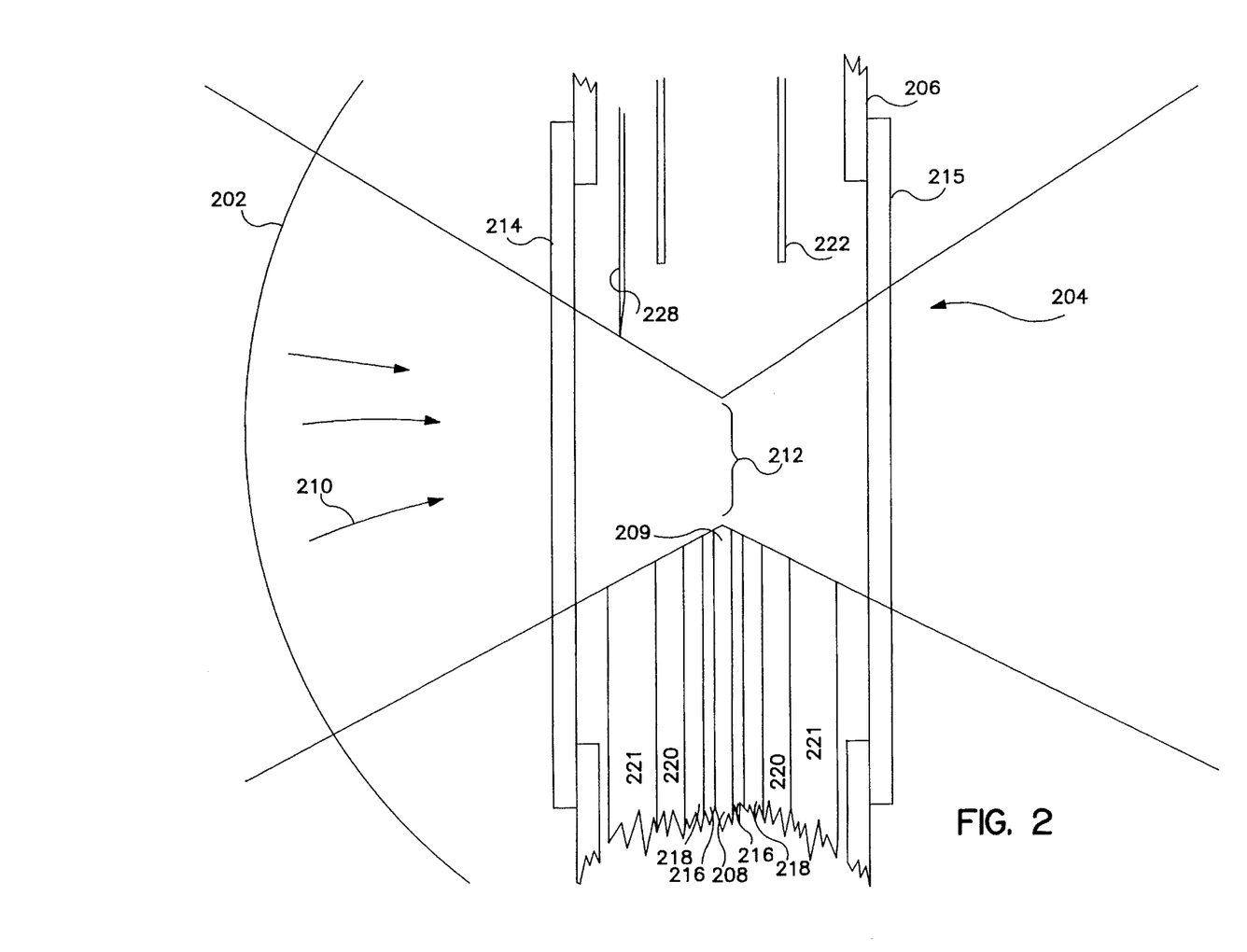
FIG. 2 is a detailed view of a solar powered furnace that will produce fullerenes.

FIG. 2 represents a method and apparatus for vaporizing carbon utilizing concentrated solar energy. FIG. 2 shows a converging parabolic mirror 202 and reflected solar energy represented by lines 210. The solar energy represented by lines 210 converges on focal point 212 of parabolic mirror 202. The area around focal point 212 comprises concentrated solar energy, represented by the convergence of lines 210.

FIG. 2 shows how a vaporization chamber 204 having chamber walls 206 can be used to contact concentrated solar energy, represented by converged lines 210, with a carbon source 208. Vaporization chamber 204 should be maintained at appropriate conditions including the temperatures, pressures, and the atmosphere selected to form fullerenes described above. Concentrated solar energy passes through window 214 and contacts the carbon source 208 at the tip 209 of carbon source 208 near the focal point 212. As the concentrated solar energy contacts carbon source 208 near focal point 212, carbon from the carbon source 208 is heated and vaporized. If vaporization chamber 204 is sealed so that materials are not introduced or removed from vaporization chamber 204 during carbon vaporization, the carbon vapor that is formed will migrate away from focal point 212, travel by convection currents to cooler portions of vaporization chamber 204, and condense into soot comprising fullerenes. After the vaporization of carbon is complete, the vaporization chamber 204 may be opened and the soot removed and further processed to recover fullerenes.

If vaporization chamber 204 is sealed, eventually, the vaporization of carbon will stop, because all of the carbon near focal point 212 will have been vaporized and will have moved away from focal point 212 by convection currents. The carbon vaporization process can be extended in time and the amounts of carbon vaporized increased by providing for continuous positioning of carbon source 208 so that the tip 209 of carbon source 208 remains in or near focal point 212 by means known in the art. Preferably, carbon source 208 will be rotated about its longitudinal axis to provide for uniform vaporization of carbon source 208 so that tip 209 of the carbon source is more evenly vaporized.

Preferably, vaporization chamber 204 is sealed to prevent gases in the atmosphere surrounding vaporization chamber 204 (such as oxygen and water vapor) from entering vaporization chamber 204. Sealing vaporization chamber 204 provides the ability to better regulate the pressure and the atmosphere selected to form fullerenes inside the vaporization chamber. In the embodiment shown in FIG. 2, conduits 216, 218, 220 and 221 provide for the introduction of an atmosphere selected to form fullerenes into vaporization chamber 204. Materials introduced to vaporization chamber 204 may then be withdrawn through conduit 222. Materials withdrawn through conduit 222 include the atmosphere selected to form fullerenes, and optionally, carbon vapor and soot. Opaque wall 228 is shown that would produce a shadow on the side of wall 228 facing away from the converging side of parabolic mirror 202.

Vaporization chamber 204 may be constructed with a device for distributing the flow of an atmosphere selected to form fullerenes so that carbon vapor is removed from the focal point 212 at a rate that is desirable and preferably directed out of vaporization chamber 204 through conduit 222. FIG. 2 shows several concentric cylinders represented by conduits 216, 218, 220 and 221. A heated transporting flow of an atmosphere selected to form fullerenes is introduced into conduit 216 to flow out of conduit 216 toward tip 209 of the carbon source and transport carbon vapor up to conduit 222. Buffer flows of an atmosphere selected to form fullerenes are introduced to conduits 218, 220 and 221. The preferable range of temperatures of the flows in the various conduits are: for the transporting flow in conduit 216, 1,200°–2,000° C., for the buffer flow in conduit 218, 800°–1200° C., for the buffer flow in conduit 220, 400°–800° C., and for the buffer flow in conduit 221, room temperature.

It may be important to construct the conduits directing the flow of an atmosphere selected to form fullerenes from graphite material. Exposure of non-graphite materials to carbon vapors may cause embrittlement of those materials and result in their eventual deterioration. Conduits constructed of graphite will withstand the temperatures involved and are more resistant to attack from the carbon vapor. Furthermore, use of electrically conductive graphite to construct the conduits will provide a means for heating those conduits and therefore, heat the transporting and buffer flows through those conduits. For example, electric current could be passed through conduits constructed from electrically conductive graphite to heat those conduits to the temperatures necessary to heat the respective flows in those conduits.

Concentrated solar energy may also be used to heat the conduits. For example, concentrated solar energy that has already passed through the vaporization zone may be reflected from appropriately located flat mirrors down to the conduits. Alternatively, tungsten resistive heater coils may be placed around the conduits (but not touching them) so that current passed through the tungsten coils will heat the tungsten coils and heat will be transferred radiatively to the conduits. Other means of heating the conduits can be used and any of these means may be combined with one or more other means for heating the conduits.

Soot removed from vaporization chamber 204 may be extracted with aromatic solvents to recover fullerenes as the soluble phase from graphitic carbon and very large fullerenes which are insoluble in aromatic solvents. Preferably, the atmosphere selected to form fullerenes and soot are removed through conduit 222 and separated into two streams by means not shown in FIG. 2. The soot can be filtered from the stream flowing in conduit 222 and the atmosphere selected to form fullerenes recycled through a pump or fan back to conduit 220 and reintroduced to vaporization chamber 204 (by means not shown in FIG. 2).

Figure 2A:
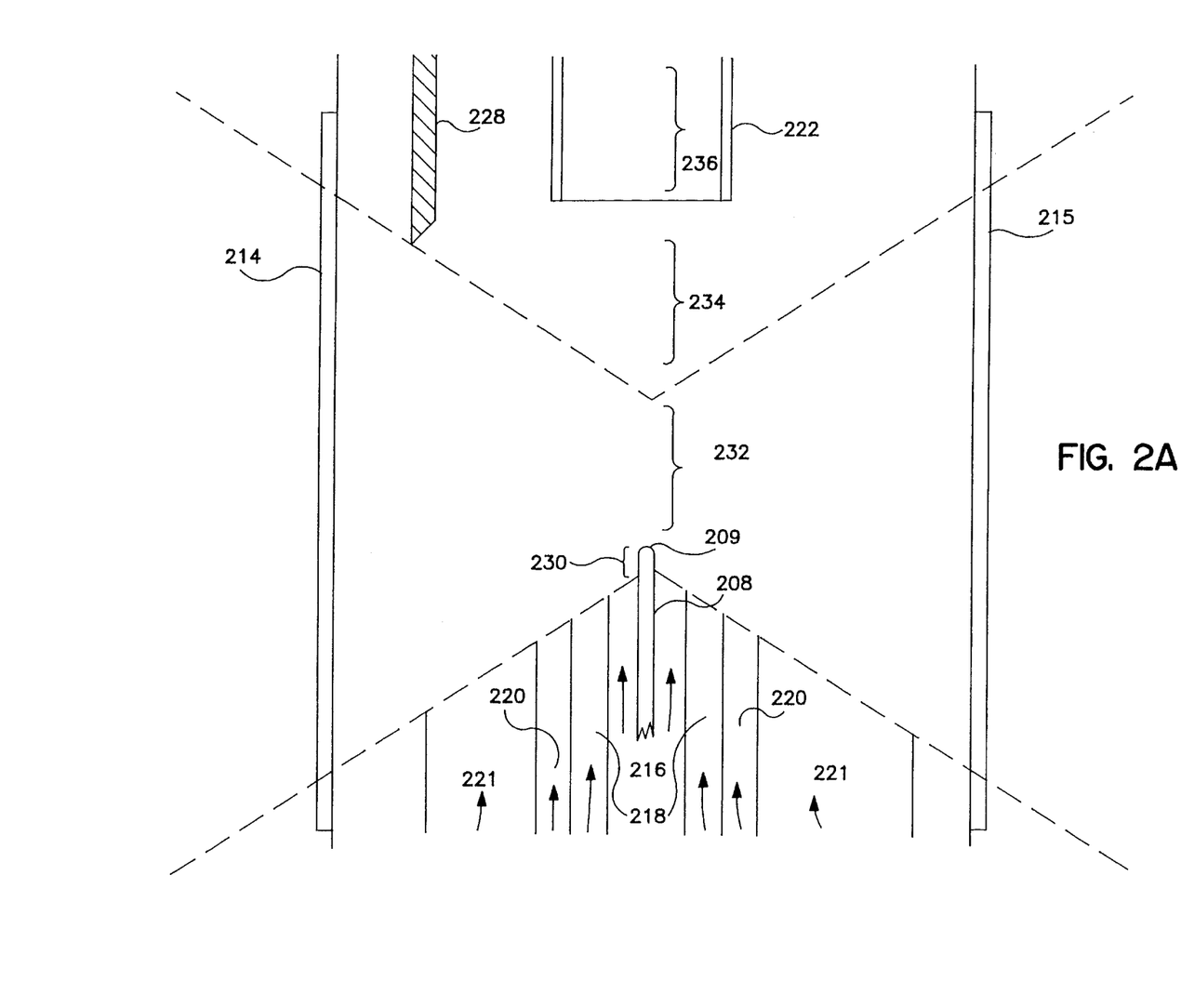
FIG. 2A shows various aspects of the solar powered furnace of FIG. 2.

FIG. 2A is a closeup drawing of the apparatus depicted in FIG. 2. FIG. 2A shows a tip 209 of carbon source 208 placed near or in the bottom portion of concentrated solar energy near where the flux density of concentrated solar energy is greatest. Carbon from tip 209 is vaporized by the concentrated solar energy. The region around where carbon is vaporized defines a vaporization zone 230. The carbon vapor produced in vaporization zone 230 is sustained as a carbon vapor in bright zone 232. In bright zone 232, the carbon vapor expands while being kept from forming into substantial amounts of large carbon clusters due to the concentrated solar energy present in bright zone 232. Carbon vapor moves out of bright zone 232 and into a fullerene growth and annealing zone 234 where conditions are favorable for formation of substantial amounts of fullerenes, preferably relatively small fullerenes, e.g. (@$C_{60}$) and (@$C_{70}$) fullerenes and, if metal compounds are contacted with the carbon vapor, metallofullerenes.

The carbon vapor and fullerenes formed from the carbon vapor pass from fullerene growth and annealing zone 234 into a condensation zone 236, which in FIG. 2A is located inside conduit 222. Conduit 222 may be cooled, for instance by a cooling coil jacket (not shown) around the outside of conduit 222 through which a cooling medium would flow.

In FIG. 2A, the arrows represented in conduits 216, 218, 220 and 221 represent the direction of flow of an atmosphere selected to form fullerenes passing through each respective conduit and through vaporization chamber 204. The flow in conduit 216 is preferably a transporting flow and assists in transporting carbon vapor from vaporization zone 230 through bright zone 232 and into fullerene growth and annealing zone 234. Flows in conduit 218, 220 and 221 are preferably buffer flows that assist in carrying the carbon vapor from vaporization zone 230 through bright zone 232 and into fullerene growth and annealing zone 234 and also assist in keeping soot from depositing on windows 214 and 215. As shown in FIG. 2A, opaque wall 228 will block a large of amount of concentrated solar energy from fullerene growth and annealing zone 234 and make fullerene growth and annealing zone 234 a dark zone.

Figure 3:
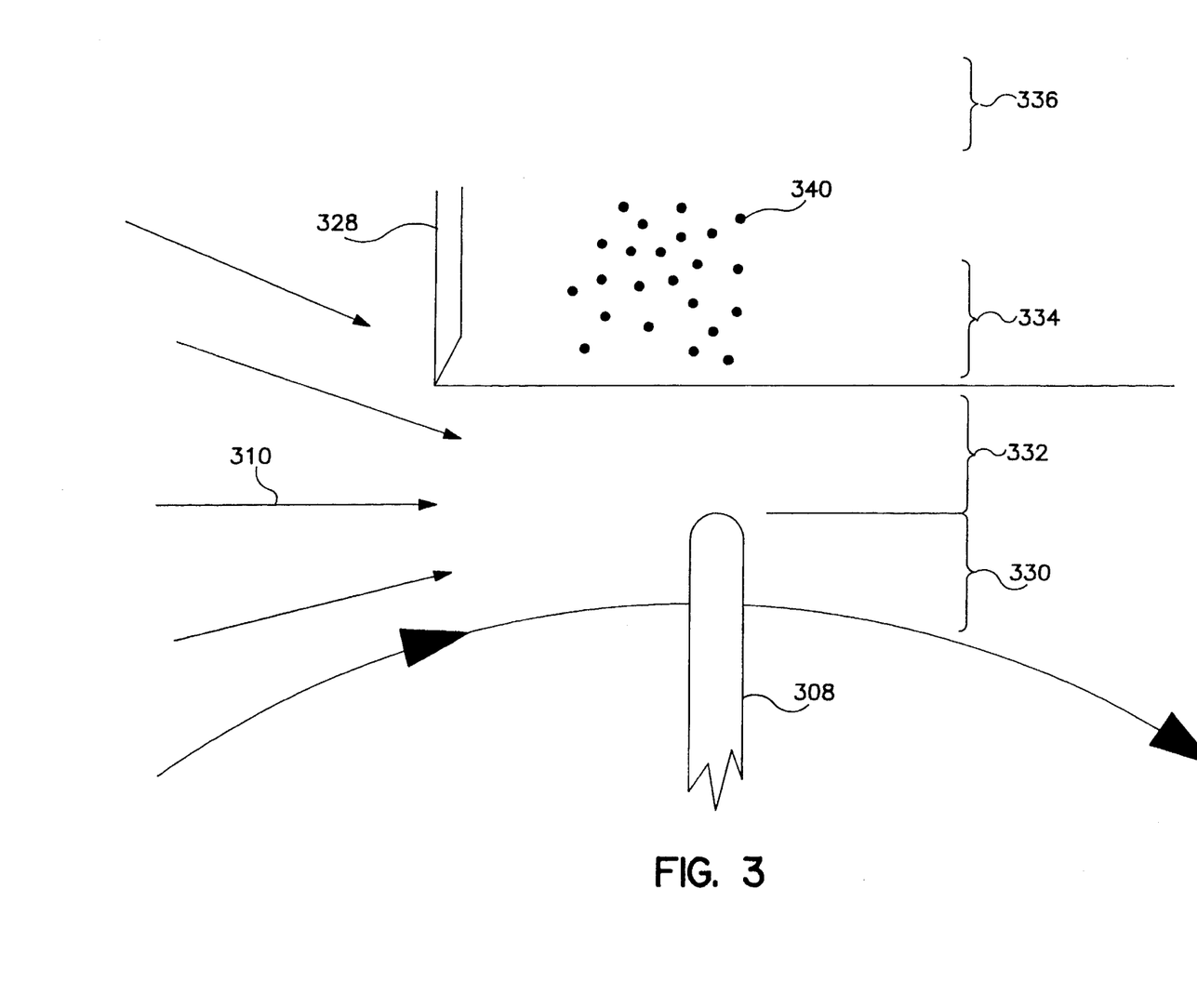
FIG. 3 is a diagram of features of a solar powered furnace designed to produced fullerenes.

FIG. 3 represents a carbon source 308 contacted by concentrated solar energy 310 to vaporize carbon from carbon source 308. A vaporization zone 330 extends in the region around carbon source 308 being vaporized by the concentrated solar energy 3 10. Carbon vapor produced is transported up through bright zone 332 and into dark zone 334. Opaque wall 328 extends down into the beam of concentrated solar energy 310 to produce a shadow on the side of wall 328 away from the directional beam of concentrated solar energy 310. The region behind opaque wall 328 is relatively dark since most of the concentrated solar energy has been blocked from passing into dark zone 334. Dark zone 334 provides for the formation of large portions of the carbon vapor into fullerenes 340. Fullerenes 340 are then transported into condensation zone 336 where they condense into soot to be recovered.

Although ultraviolet radiation will be given off during the vaporization of carbon source 308, the vaporization temperatures experienced utilizing concentrated solar energy are much lower than temperatures in prior art processes using electric arcs. Therefore, the amount of UV radiation produced will be lower in comparison to an electric arc process. Secondly, intensity of UV radiation will decrease in proportion to the square of the distance from the source of the UV radiation. Therefore, although some UV radiation will be entering dark zone 334, the intensity of the UV radiation will be relatively low, and dark zone 334 will be relatively dark.

One method of vaporizing carbon in accordance with this invention utilizes concentrated solar energy to produce a carbon vapor. Preferably, sunlight is collected by a system of flat mirrors that track the sun and reflect the sunlight into a parabolic mirror. Alternatively the focusing and solar collection can be accomplished by mounting the focusing mirror to track the sun as in FIG. 4. Sunlight may also be focused by one or more lens(es) or any other light focusing means to collect and/or focuses sunlight sufficiently to vaporize carbon. The light focusing means and materials of construction for the apparatus are conventional materials such as glass, quartz, stainless steel, and the like known to those skilled in the art of constructing such an apparatus.

Figure 4:
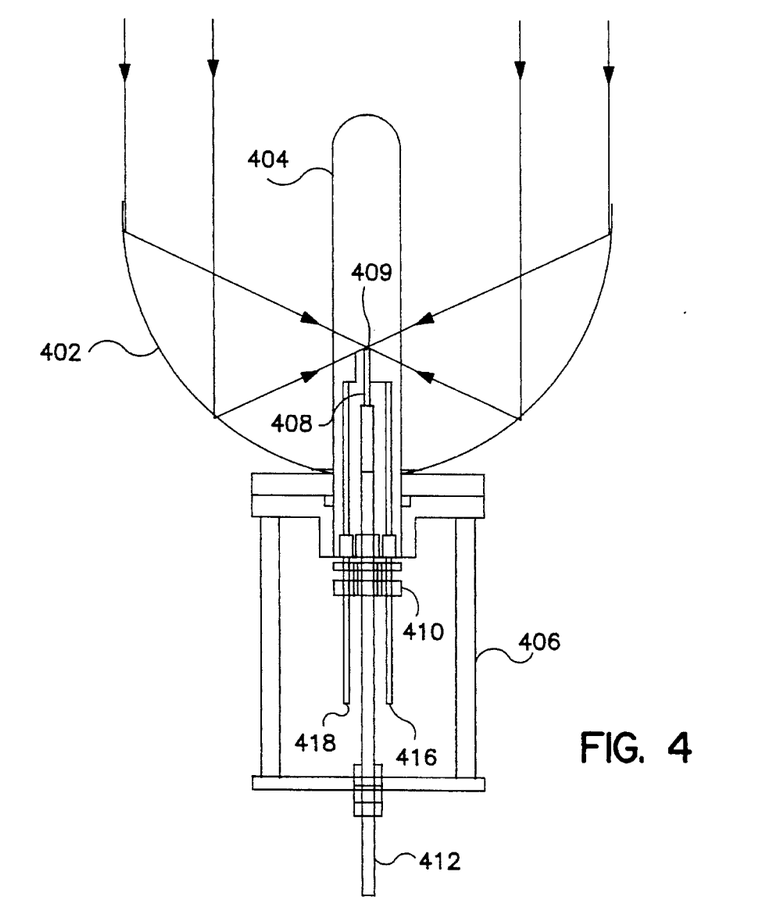
FIG. 4 is a schematic of the solar powered furnace of Example 1.

In FIG. 4, parabolic mirror 402 is mounted to housing 406 which in turn is placed in a conventional equatorial telescope mount with a motorized drive (not shown) so that parabolic mirror 402 continually tracks the sun. At the center of parabolic mirror 402, glass tube 404 is mounted and sealed in housing 406. A feed rod 412 passes through sealing plate 410 and into the region inside glass tube 404. The tip 409 of carbon source 408 is positioned near the focal point of parabolic mirror 402.

Figure 4A:
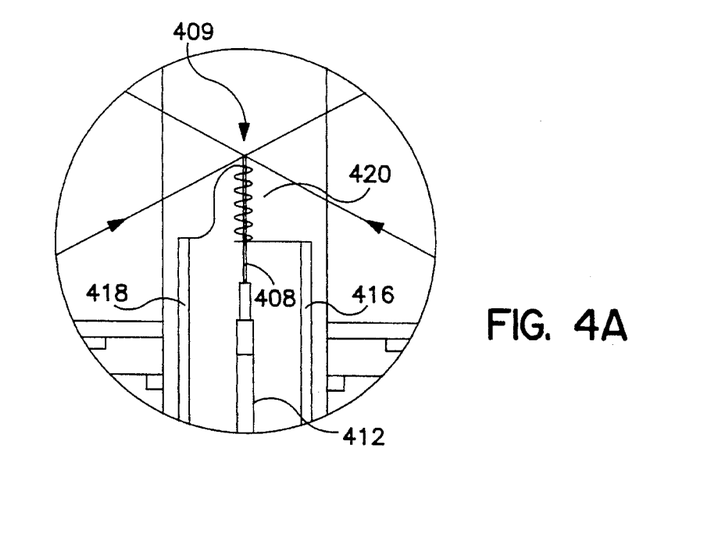
FIG. 4A shows various aspects of the solar powered furnace shown by FIG. 4.

The base of carbon source 408 is firmly mounted to feed rod 412 which passes out through sealing plate 410 and housing 406. Heater connectors 416 and 418 pass through sealing plate 410 to provide electric current to tungsten heater coil 420 shown in FIG. 4A. Tungsten heater coil 420 provides supplemental heat to carbon source 408.

In operation, glass tube 404 is evacuated to the appropriate pressure of an atmosphere selected to form fullerenes and sealed with sealing plate 410. Tip 409 of the carbon source is placed near the focal point of parabolic mirror 402 which in turn is aimed at the sun. Concentrated solar energy near the focal point of parabolic mirror 402 heats and vaporizes carbon from tip 409 of the carbon source. Carbon vapor is formed and migrates by convection currents up away from the carbon source and eventually condenses, leaving a soot on the inside walls of the upper portions of glass tube 404. Feed rod 412 may be rotated to evenly vaporize tip 409 of the carbon source and advanced toward the focal point of parabolic mirror 402 as carbon source 408 is vaporized in order to keep tip 409 of the carbon source near the focal point of parabolic mirror 402.

EXAMPLE 1

As an initial demonstration that fullerenes can in fact be produced by direct sunlight, the apparatus shown schematically in FIG. 4 was assembled. Sunlight was collected by the parabolic mirror (402) (Malles Griot, electroformed nickel with rhodium finish, 35.6 cm. outer diameter, 6 cm focal length) and focused on the tip of a 0.4 mm. diameter graphite rod (408) (Poco Graphite AXM-5Q). As shown in FIG. 4, this rod was mounted inside a 58 mm. ID, 2 mm. wall, 30 cm. long pyrex tube (404) and arranged such that it could be translated along the optic axis of the paraboloid. To minimize the extent of conductive heat loss and to help anneal the carbon clusters as they grew from the vapor, the graphite rod was enclosed by a helical tungsten heater (420) (8 turns on 3 mm. dia. cylinder, 10 mm. length, 0.25 min. diameter tungsten wire) mounted 3 millimeters below the tip of the target rod as shown in FIG. 4. In practice, the system was evacuated to less than 30 milli Torr and degassed with the tungsten heater in operation for several hours to remove absorbed gases from the graphite rod, purged and then backfilled with 50 Torr argon and sealed off. The apparatus was then mounted on the yoke of a 8 inch equatorial telescope mount (Celestron Pacific) and adjusted so that the sunlight was focused directly on the tip of the graphite target. With careful alignment of the equatorial axis to the earth's rotation, the motorized telescope mount was easily able to track the sun for several hours without need for further adjustment.

This fullerene generation apparatus was operated for 3 hours (11 a.m.–2 p.m.) on a day when the direct solar flux at the test site (at 1400 m elevation) was measured to be 800–900 watts/m$^2$. During operation, the central axis of the evaporator made an angle of 10°–25° from vertical while tracking the sun. As a result, the argon gas heated by the tungsten heater was efficiently carried up over the solar-irradiated carbon tip by convection and the condensing carbon vapor was quickly swept out of the intense sunlight, cooled in the upper regions of the pyrex tube, and subsequently deposited on the upper walls.

Figure 5:
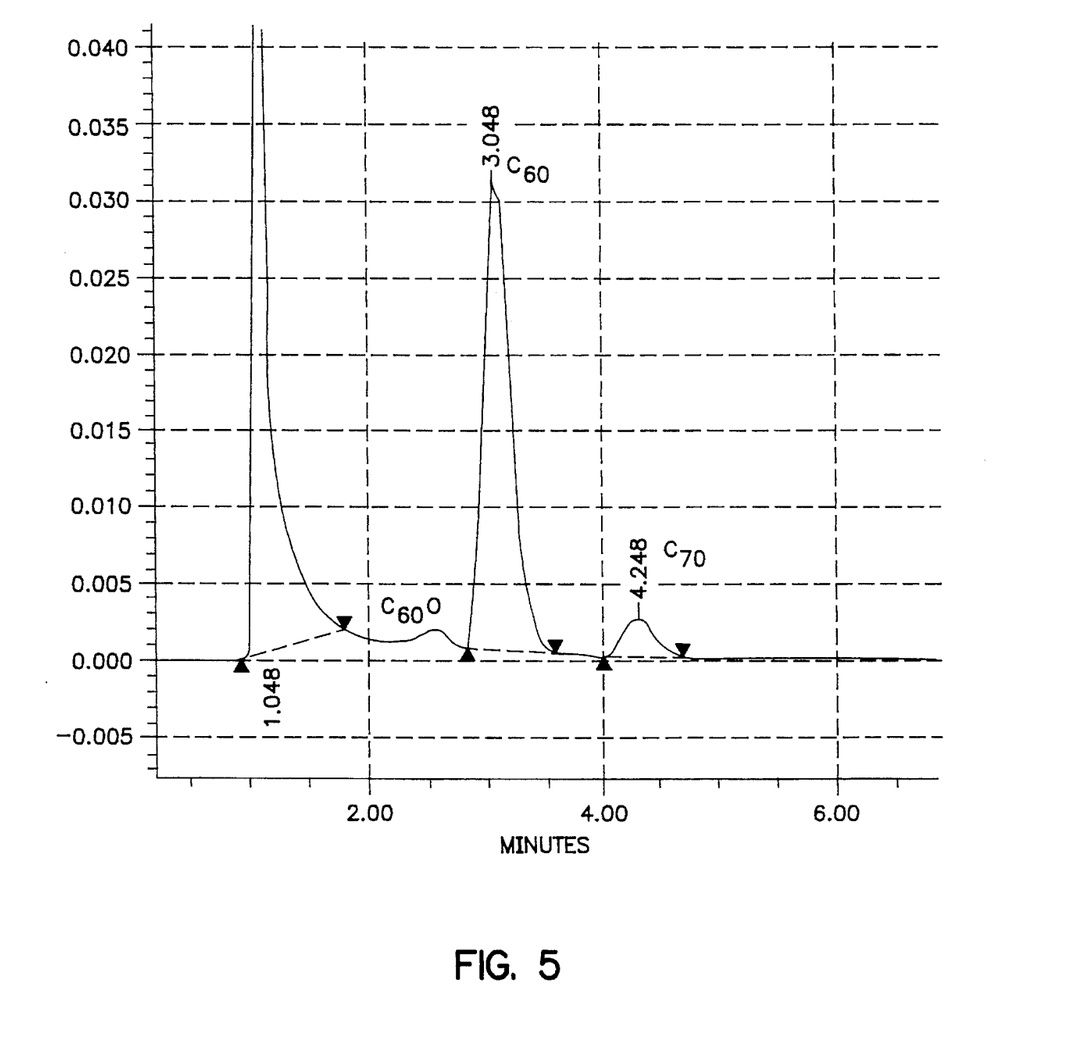
FIG. 5 is a plot of optical density at 306 nm vs. time from the HPLC analysis of the toluene soluble extract produced by solar vaporization of a graphitic carbon rod in the apparatus of FIG. 4.

The fullerene content of the soot deposits collected on the inside of the pyrex tube was analyzed by extraction with toluene followed by detection of the fullerene content by high pressure liquid chromatography, HPLC, (Waters 510 pump, 996 photodiode array) on a reversed phase column (Waters Nova-pak C-18, 3.9×300 mm.) with toluene/methanol (50:50 at 2 m./min) as the eluant. With the photodiode array, fullerenes were identified by their characteristic UV/vis spectra. Fullerene yields in the soot extract were estimated by comparison with calibrated standards at 306 nm. The toluene extract had the wine-red color characteristic of high-yield fullerene soots. Over the three hour experiment 5 mg of carbon was evaporated from the target. Most of this was found to dissolve in toluene at room temperature. FIG. 5 shows the HPLC analysis of this soluble fraction, demonstrating that its fullerene content was predominantly $C_{60}$ and $C_{70}$. The fullerene yield from this initial trial run was 30%. (However, because the amount of soot produced was so small, an accurate measurement of the yield could not be made.)

Figure 6:
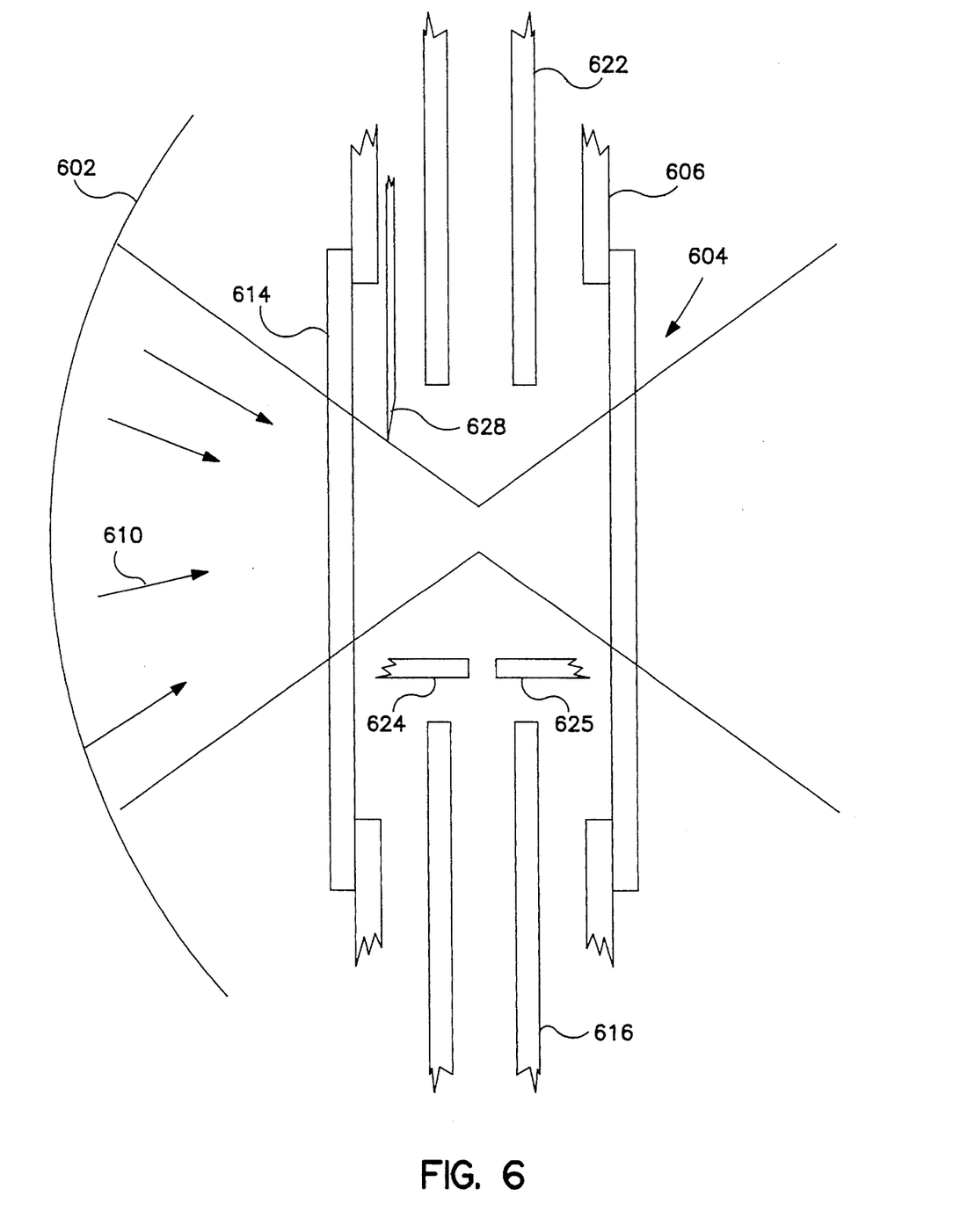
FIG. 6 is a diagram of an apparatus for vaporizing carbon with an electric arc and concentrated solar energy.

In another embodiment of the invention, concentrated solar energy may be used to produce a bright zone in conjunction with other known methods of vaporizing carbon, for example, a carbon arc carbon vaporization process. A sketch of one embodiment of this aspect of the invention is shown in FIG. 6 where parabolic mirror 602 reflects concentrated solar energy represented by lines 610 into a vaporization chamber 604. Opaque wall 628 is located appropriately in vaporization chamber 604 to produce a dark zone on the side of opaque wall 628 away from the converging side of parabolic mirror 602.

Vaporization chamber 604 further comprises electrodes facing each other. In FIG. 6, electrodes are represented by reference characters 624 and 625. One or both electrodes may be carbon electrodes and also serve as the carbon source. To begin operation, the electrodes are brought together to start electrical conduction and then pulled apart to form an electrical arc by means well known in the art. Carbon from the carbon electrodes is vaporized by heat from the arc up into the bright zone above electrodes 624 and 625. An atmosphere selected to form fullerenes may be passed through conduit 616 to transport carbon vapor through a bright zone up into a fullerene growth and annealing zone. Materials including carbon vapor, soot and an atmosphere selected to form fullerenes may be removed from vaporization chamber 604 through conduit 622. The flow of an atmosphere selected to form fullerenes through conduit 616 may be a transporting flow as described earlier in this specification.

Alternatively, both electrodes may be constructed of a material that is not carbon, for example, tungsten, and carbon may be introduced to the vaporization chamber 604 through conduit 616. For example, carbon powder dispersed in an atmosphere selected to form fullerenes and heated to 800°–1200° C. can be introduced through conduit 616 to the area around the electric arc between electrodes. Energy from the electric arc vaporizes the carbon, which passes through a bright zone formed by the concentrated solar energy represented by lines 610. Some, preferably most, of the carbon clusters formed in the carbon vapor as it moves away from the arc will be revaporized in the bright zone by the concentrated solar energy. The carbon vapor will then be transported into a fullerene growth and annealing zone, where it will form into fullerenes which may then be recovered. Powdered carbon introduced through conduit 616 can also be vaporized by RF discharge, or other methods, condensed into fullerenes, and withdrawn through conduit 622.

Many other variations and modifications may be made in the apparatus and techniques hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim:

1. A process for generating fullerenes which comprises:
   (a) vaporizing carbon in a vaporization zone by contacting a carbon source with concentrated solar energy in an atmosphere selected to form fullerenes;
   (b) establishing a solar energy flux in a separate bright zone at a level sufficient to maintain carbon vapor in a form having carbon clusters of about 30 or less carbon atoms;
   (c) passing vaporized carbon from said vaporization zone through said bright zone by establishing a gas flow through said vaporization zone and said bright zone, whereby the carbon vapor in said bright zone expands to provide a lower concentration of carbon in the carbon vapor, and the carbon vapor in said bright zone is maintained in said form; and
   (d) passing the vaporized carbon in said form from said bright zone through a dark fullerene growth and annealing zone maintained under conditions to promote both reaction of the carbon in the carbon vapor to form fullerenes, and annealing of fullerenes, by continuing said gas flow through said dark fullerene growth and annealing zone.

2. A process in accordance with claim 1 wherein said vaporizing carbon is accomplished by directing a beam of concentrated solar energy into a vaporization chamber comprising a carbon rod and vaporizing carbon from said carbon rod.

3. A process in accordance with claim 1 wherein said bright zone comprises carbon vapor, concentrated solar energy and an atmosphere selected to form fullerenes.

4. A process in accordance with claim 1 wherein the light intensity in said dark fullerene growth and annealing zone is one-fifth of the light intensity on a vaporizing surface of said carbon source.

5. A process in accordance with claim 1 wherein a transporting flow of an atmosphere selected to form fullerenes is established through the vaporization zone toward the fullerene growth and annealing zone.

6. A process in accordance with claim 1 wherein the atmosphere selected to form fullerenes is selected from the group consisting of helium, neon, argon, krypton, xenon, and mixtures thereof.

7. A process in accordance with claim 6 wherein said conditions to promote growth and annealing of fullerenes comprise maintaining the dark zone at a temperature in the range of 1200° to 1500° C., at a pressure in the range of 1 to 100 Torr and in an atmosphere selected to form fullerenes.

8. A process in accordance with claim 6 wherein the vaporization zone temperature is at least 3000° C.

* * * * *